April 28, 1936.   R. W. BENFER   2,038,980
FILM GUIDING APPARATUS
Filed Nov. 14, 1934   2 Sheets-Sheet 1

INVENTOR
R. W. BENFER
BY
G. H. Heydt.
ATTORNEY

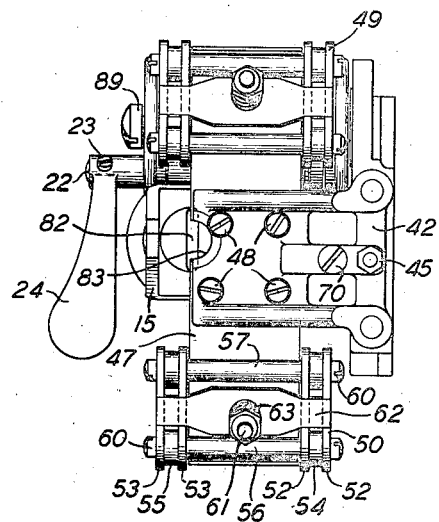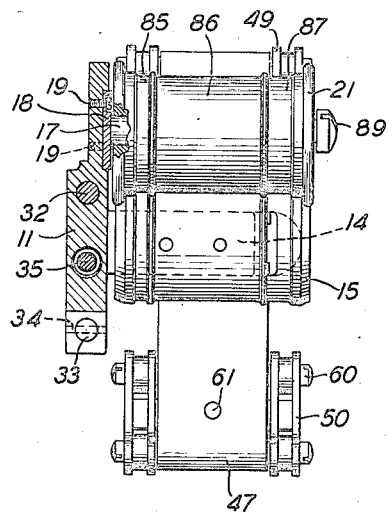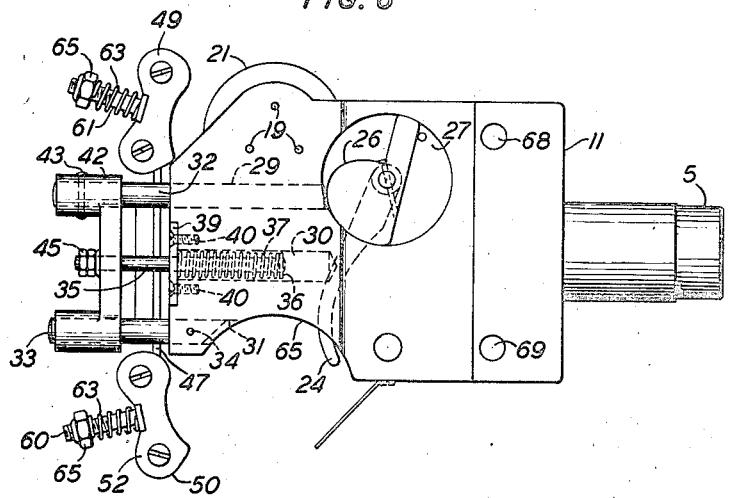

Patented Apr. 28, 1936

2,038,980

UNITED STATES PATENT OFFICE 2,038,980

FILM GUIDING APPARATUS

Richard W. Benfer, New Rochelle, N. Y., assignor, by mesne assignments, to Western Electric Company, Incorporated, a corporation of New York Application November 14, 1934, Serial No. 752,995

5 Claims. (Cl. 179—100.3)

This invention relates to sound picture recording and reproducing apparatus and more particularly to an improved film propelling and guiding means employed in such apparatus.

The film driving and guiding mechanism of sound picture recording and reproducing machines of the prior art generally include a filtered sound sprocket for driving the film past the exposure aperture at uniform speed and a guide unit for supporting the film at the exposure aperture. Also, there is usually included one or a number of idler rollers engaging the film preceding its engagement with the guide unit. Many different forms of film guide units are disclosed in the prior art. These prior art disclosures include fixed flat apertured film guide units, freely rotatable roller guide units and fixed curved film guide units.

It has been a common practice with the use of fixed guide units of the prior art to provide recesses in certain portions of the film engaging surface of the unit. These recesses are usually provided in that portion of the film engaging surface which is in the path of movement of the picture record or the sound record or both. These recesses are provided in the prior art discloses for the single purpose of preventing scratching of the film record areas by eliminating frictional contact between the record areas of the moving film and the surfaces of the fixed guide members.

It is well known that the general conditions of film reproduction necessitate sprocket drive of the film and that for a sound film the sprocket must rotate with a high degree of constancy to avoid pitch changes or flutter. The filtered constant speed sound sprocket now employed drives the film at uniform speed free from disturbances which might be introduced by slight manufacturing irregularities in the gears which are included in the driving connection from the main driving source. However, it has been found that a disturbance is introduced in the film beyond the sound sprocket and its filtered drive, which disturbance introduces undesired tones in the reproduced sound. This disturbance is usually evidenced as a 96 cycle modulation of the signal reproduced from the sound record.

It has been found that the most likely causes for this disturbance are, first, the interaction of the sprocket teeth, which are of a fixed pitch, with the sprocket holes of commercial release films whose pitch has been considerably lessened due to shrinkage of the film after use; and second, the interaction of the sprocket perforations of the film with stationary surfaces of the film guide members. The sprocket perforations of the film interact with sprocket teeth and stationary surfaces of film guide members at the rate of 96 times per second due to the fact that standard film, which is driven past an exposure aperture at the rate of 24 picture frames per second, has four sprocket perforations per frame. This disurbance of the film will be termed "96 cycle flutter" throughout this specification.

It is the object of this invention to provide a sound film recording or reproducing apparatus in which the film will be driven past the sound exposure aperture at a uniform speed free from disturbances normally introduced by interaction of the film perforations with both the stationary guiding surfaces and the sprocket teeth of the guiding and driving mechanism.

A feature of the invention lies in the provision of an improved fixed guide unit at the sound exposure aperture having a film bearing surface designed to engage and support the moving film in a manner to substantially reduce sprocket hole disturbance.

A further feature of the invention lies in the provision of a film guide unit in the form of a removable attachment for sound reproducing mechanism of sound film reproducing machines, which will have mounted thereon as a unit assembly therewith all the essential film guiding and film retaining elements.

In accordance with applicant's invention there is provided an improved film guide unit for the sound reproducing portion of sound picture reproducing apparatus which may be readily inserted into such apparatus in the field. The improved unit comprises a base casting on which is mounted a standard lens tube, a fixed curved film guide and an idler roller. The base casting has movably mounted therein a plate on which are yieldably mounted two film retaining members one of which retains the film on the idler roller and the other of which retains the film on the sound sprocket. A unitary means possessing novel structural features is provided for simultaneously moving the film retaining members into or out of film engaging position.

In applicant's device the film engaging surface of the idler roller and the film engaging surface of the fixed curved film guide are recessed in the path of movement of certain portions of the film in a manner to appreciably reduce ninety-six cycle flutter. Specifically, in addition to being recessed in the path of movement of the picture record and the sound record, the film guide of applicant's invention is provided with recesses in the path of movement of the sprocket hole perforations of the film.

Applicant's invention may be more clearly understood by reference to the accompanying drawings in which:

Fig. 4 is an end view of the unit shown in Fig. 3;

Fig. 5 is a detail view, partly in section on the line 5—5 of Fig. 3; and

Fig. 6 is a rear view of the unit shown in Fig. 3.

Figure 1:
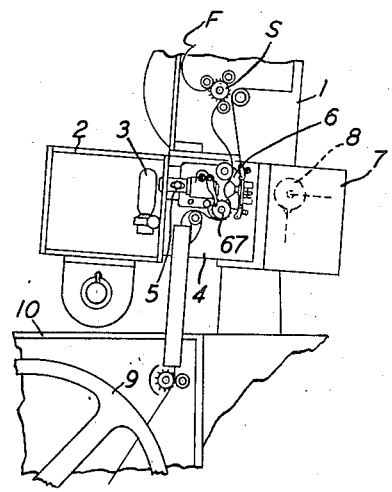
Fig. 1 shows a sound picture reproducing machine incorporating the novel film guiding unit of this invention.

Fig. 1 shows a sound picture reproducing apparatus including a casing 1 containing picture projecting apparatus. A sound film reproducing unit includes a compartment 2, containing an exciting lamp 3, a compartment 4 containing a lens tube 5 and film guide unit 6, and a compartment 7 containing a photoelectric cell 8. A take-up reel 9 is housed in a take-up reel housing 10. A film F is shown threaded through the machine from the last sprocket S of the picture projection mechanism to the take-up reel 9.

Figure 3:
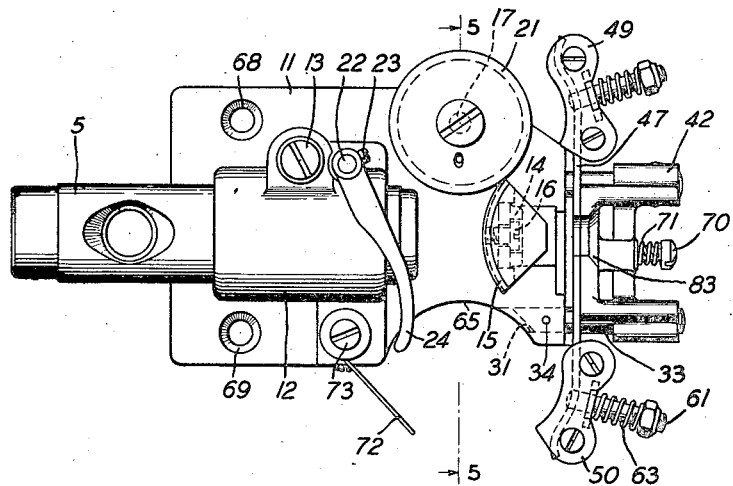
Fig. 3 shows a front view of the removable film guiding unit of the invention.

Referring to Fig. 3, 11 indicates a base casting. Integral with this casting 11 is a portion 12 in the form of a split cylinder. Into this cylinder is placed a circular lens tube 5. By means of a screw bolt 13, the separated ends of the split cylinder 12 are brought together to clamp the lens tube 5 in adjusted position. Integral with the base casting 11 is an extended member 14 to which a fixed curved film guide member 15 is secured by means of screws 16.

A bearing 17 provided with an end flanged portion 18 (Fig. 5) is secured to the base casting 11 by means of screws 19. A roller 21 is mounted on bearing 17 to be freely rotatable thereon. The free end of shaft 17 has an internal thread to receive a machine screw 89 for the purpose of retaining roller 21 on the shaft 17.

A shaft 22 extends through the base casting 11 and is freely rotatable therein. Shaft 22 has a lever arm 24 secured to one end thereof by means of set screw 23. To the opposite end of shaft 22 is secured a cam member 26 (Fig. 6) which is rotatable in a circular recess 27 in the casting 11. It will be seen that the cam 26 is rotated by a movement of the lever arm 24.

Referring to Fig. 6, the base casting 11 is provided with three circular elongated recesses 29, 30, and 31. A rod 32 extends into recess 29 and is slidable therein. A rod 33 is fixedly mounted in recess 31 by means of a pin 34. A rod 35 is slidably mounted in recess 30. One end of rod 35 is flanged, as at 36. Surrounding rod 35 is a coil spring 37 one end of which bears against the flanged portion 36 of rod 35. A cover plate 39 fits over rod 35 and is secured to the base casting 11 in a recess therein by means of screws 40. The other end of spring 37 bears against the cover plate 39.

A U-shaped carrier unit 42 is provided with holes to receive the ends of the rods 32, 35, and 33. The carrier 42 is secured to rod 32 by means of a pin 43. Carrier unit 42 is slidable along the fixed rod 33. The free end of rod 32 bears against the working face of cam 26. The carrier unit 42 bears against lock nut 45 on the free end of shaft 35. It will be seen that movement of the member 24 in a counter-clockwise direction (as seen in Fig. 3) produces, through the cam 26, an outward movement of rod 32 and carrier 42 against the action of spring 37. A reverse movement of member 24 will produce an inward movement of the rods 32, 35 and carrier 42 under the action of spring 37.

A plate 47 is secured to the carrier member 42 by means of screws 48 (Figs. 4 and 5). Plate 47 has yieldably mounted at opposite ends thereof, film retaining means 49 and 50. As the two film retaining means and their mountings are identical, a description of one will suffice.

The film retaining means comprises two pairs of film retaining shoes 52 and 53 held apart by means of annular spacers 54 and 55, respectively. Rods 56 and 57 are provided with enlarged central portions and reduced end portions. The end portions of these rods receive the film retaining shoes 52 and 53 and the spacers 54 and 55. The inner shoe of each pair bears against the enlarged central portion of the rods 56 and 57. The retaining shoes 52 and 53 and spacers 54 and 55 are held on the rods 56 and 57 by means of machine screws 60 which fit into internal threading in the reduced end portions of rods 56 and 57.

A rod 61 is secured at one end thereof to plate 47. A cross-bar 62 is loosely mounted on rod 61. One end of the cross-bar 62 bears against the rear of film retaining shoes 52 while the other end thereof bears against the rear of film retaining shoes 53. A spring 63 surrounds rod 61. One end of spring 63 bears against the cross-bar 62. The free end of rod 61 is threaded to receive a nut 65 against which the other end of spring 63 rests. It is seen from the description that the film retaining members 49 and 50 are movable along the axis of the rod 61 against the action of spring 63. The film engaging surface of the retaining shoes of film retaining member 49 are curved to correspond to the curvature of the roller 21 while the corresponding surface of the film retaining shoes of film retaining member 50 are curved to correspond to the curvature of a constant speed film sprocket 67 (Fig. 1).

The lower central section of casting 11 is provided with a circular cut-out portion 66 to provide clearance for the constant speed sprocket 67 when the casting 11 is secured to the inner vertical wall of the chamber 4 by means of machine screws inserted into holes 68 and 69 (Fig. 3) of the casting 11.

A threaded guide rod 70 (Figs. 3 and 4) extends through carrier member 42. One end of this rod 70 bears against the base casting 11. A coiled spring 71 surrounds rod 70 between the carrier 42 and the slotted head of the rod. The rod 70 provides a means of adjusting the distance of inward movement of carrier 42 and consequently an adjustment of the pressure to be exerted by the film retaining shoes against the film F on roller 21 and sound sprocket 67.

A stripper 72 is secured to casting 11 by means of a machine screw 73. The stripper is provided to prevent complete wrapping of the film F around the sprocket 67.

Figure 2:
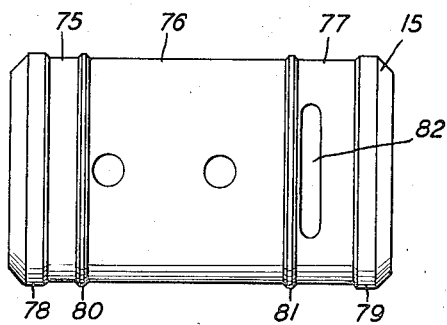
Fig. 2 is an enlarged detail of the fixed curved film support of the film guiding unit.

Referring to Fig. 2, the stationary film guide plate 15 is provided with recessed portions 75, 76 and 77. The portion 75 is located in the path of movement of one row of sprocket teeth perforations of the film F. Recessed portion 76 is in the path of movement of the picture area of the film F. Recessed portion 77 is in the path of movement of the sound record and another row of sprocket teeth perforations of the film F. The marginal edges of the film are supported by the raised portions 78 and 79 of the member 15 while the raised portions 80 and 81 provide a support for the film intermediate the marginal edges thereof. An aperture 82 is provided in the recessed portion 77 of member 52 to permit light projected from lamp 3 to the sound record of film F to be projected to the photoelectric cell 8. Immediately in back of the aperture 82, the plate 47 and carrier 42 are provided with a circular cut-out portion 83 (Fig. 4) to permit direct projection of the light beam from aperture 82 to the photoelectric cell 8.

Referring to Fig. 5, roller 21 is provided with recessed portions 85, 86, and 87 which are aligned with recessed portions 75, 76, and 77, respectively of the stationary guide unit 15.

It will be seen from the description that in a film guide unit constructed in accordance with applicant's invention, the possibility of ninety-six cycle flutter in the film caused by interaction of the sprocket perforations of the film with the surfaces of stationary and rolling film guide members is reduced to a minimum by reason of the provision of recessed portions in all such members in the path of movement of the sprocket perforations of the film. Ninety-six cycle flutter in the film caused by interaction of the sprocket teeth of the sound sprocket 67, which are of fixed pitch, with the sprocket perforations of film F, whose pitch has been changed due to excessive shrinkage of film with use, is eliminated in the present invention by the provision of the curved film retaining shoes for the sound sprocket. These shoes provide sufficient wrapping action between the film and the barrel of the sprocket 67 so that the rotation of the barrel tends to carry the film along during the instant a sprocket tooth is not in exact engagement with the driving edge of a sprocket hole perforation of the film.

For the sake of clearness all the figures of the accompanying drawings show the film retaining shoes in non-film engaging position as they would be at the time the film is being threaded through the machine. It is obvious, however, that these film retaining shoes may be simultaneously moved into film engaging position by movement of the lever 24.

What is claimed is:

1. In combination, a sound film recording or reproducing apparatus having a sound exposure aperture therein, means for supporting said film at said exposure aperture, said means comprising a fixed member having a film engaging surface, said film engaging surface having depressed portions in the path of movement of the marginal perforations of said film.

2. A supporting unit for use with a sound picture film comprising a fixed member having a film engaging surface, said film engaging surface having a plurality of spaced raised portions, the distance between two of said raised portions being approximately of the same width as the combined width of the sound record and a sprocket perforation of said film, and a space between two others of said raised portions being approximately of the same width as the width of a film sprocket perforation.

3. A supporting unit for use with sound picture film comprising a fixed member having a film engaging surface, said surface having a marginal depressed portion in the path of movement of one row of film sprocket perforations and an adjacent sound record area of said film.

4. An attachment for sound film recording and reproducing machines comprising a base casting, a roller film guide, a stationary film guide, means for retaining a film on said roller film guide, a spring tensioned movable carrier for said retaining means, a cam rotatable in said casting, means for controlling the rotation of said cam, and means secured to said carrier and engaging the working face of said cam whereby movement of said cam controlling means produces movement of said film retaining means into and out of film engaging position with said roller film guide.

5. An attachment for sound film recording and reproducing machines comprising a base casting, a roller film guide, means for retaining a film on said roller film guide, a movable carrier for said retaining means, a recess in one side of said casting, a cam rotatable in said recess, means secured to said cam and extending through said casting for controlling the rotation of said cam, a rod movably mounted in said casting, one end thereof engaging the working face of said cam, means for securing another end of said rod to said carrier whereby movement of said cam controlling means produces movement of said film retaining means, and spring tensioned means mounted in said casting and engaging said carrier to oppose the movement of said film retaining means to non-film engaging position.

RICHARD W. BENFER.